Aug. 9, 1955

R. J. DOLUDE 2,714,947

SERVO MECHANISM

Filed May 24, 1951

ROMAN J. DOLUDE,
INVENTOR.

BY R. E. Geauque

ATTORNEY

Aug. 9, 1955  R. J. DOLUDE  2,714,947
SERVO MECHANISM
Filed May 24, 1951  4 Sheets-Sheet 2

ROMAN J. DOLUDE,
INVENTOR.

BY R. E. Geangue

ATTORNEY

Aug. 9, 1955

R. J. DOLUDE 2,714,947

SERVO MECHANISM

Filed May 24, 1951

ROMAN J. DOLUDE,
INVENTOR.

BY R. E. Grangue

ATTORNEY

United States Patent Office 2,714,947
Patented Aug. 9, 1955

2,714,947

SERVO MECHANISM

Roman J. Dolude, Los Angeles, Calif., assignor to Summers Gyroscope Company, Santa Monica, Calif., a corporation of California Application May 24, 1951, Serial No. 227,999

8 Claims. (Cl. 192—142)

This invention relates to servo mechanisms, and more particularly to a high-torque-to-inertia type of servo in which the kinetic energy of a fly wheel is electrically clutched to engage a train of gears directly linked to the output shaft. A novel automatically operated braking device is provided for minimizing overshoot.

To this end, in the absence of an electrical signal to either of the control clutches, the gear train is automatically retarded by a braking device and upon a control signal, the retarding force exerted against the gear train by the braking device is removed.

It is therefore an object of the present invention to provide a servo mechanism which responds quickly to control signals without an undesirable overshoot. A still further object of this invention is to provide a brake mechanism which will not permit any appreciable servo output in the absence of a control signal. Still another object of this invention is to provide a servo mechanism in which the gear train is made substantially non-reversible through the expedient of a braking device.

These, and other objects not specifically enumerated above, will become readily apparent from the following description and accompanying drawings in which.

Figure 1:
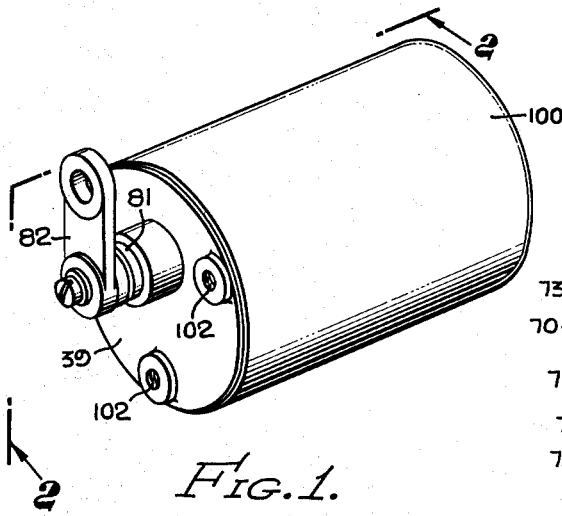
Fig. 1 is a perspective view of the servo mechanism of this invention.
Figure 10:
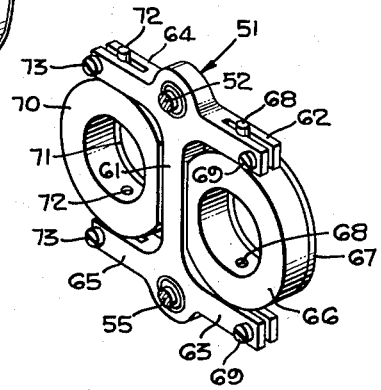
Fig. 10 is a perspective view of the yoke member and clutch brakes mounted thereby.
Figure 2:
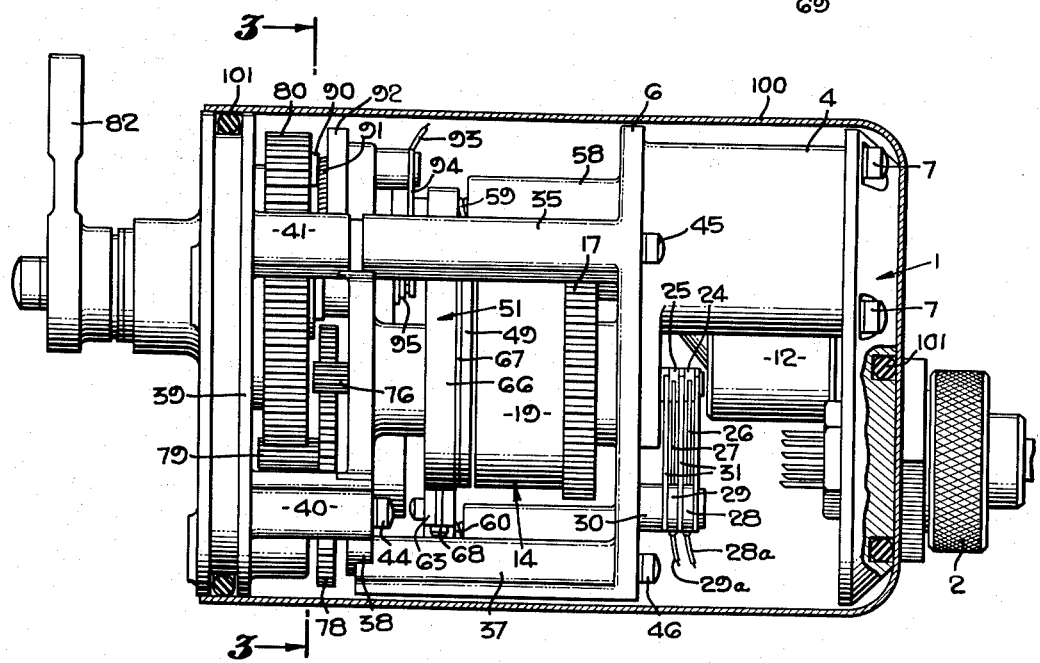
Fig. 2 is a vertical sectional view taken along lines 2—2 of Fig. 1, showing the elements of the invention in elevation.
Figure 3:
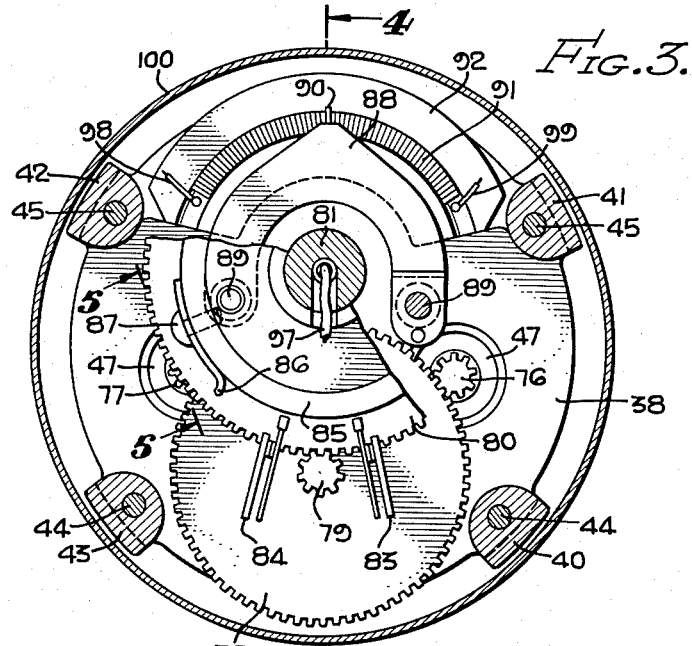
Fig. 3 is a vertical transverse section taken along lines 3—3 of Fig. 2, showing the elements of the invention driven by the magnetic clutches.
Figure 5:
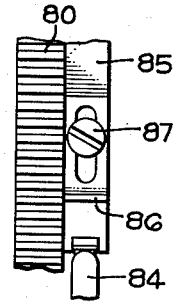
Fig. 5 is an elevational view along lines 5—5 of Fig. 3, illustrating the limit switch activating arm.

The embodiment of the present invention chosen for illustration is comprised of a back mounting plate 1, which contains the electrical plug 2 and ball bearings (not shown) for supporting one end of motor shaft 3. A pair of frame sections 4, 5 are integrally formed with a disk section 6 and are secured to plate 1 by means of screws 7. These frame sections serve to space the disk section 6 from the back plate 1 and to rigidly fasten the disk section and the back plate together. A ball bearing 8 is contained in disk section 6 and serves to support an end of shaft 3 so that shaft 3 is mounted for rotation by disk section 6 and back plate 1. A cylindrical member 9 is rigidly secured to back plate 1 and mounts a permanent magnet 10 in position to cooperate with the winding 11, which is secured to shaft 3 for rotation therewith. A fly wheel 12 is likewise secured to shaft 3 and is in the form of a cup which surrounds the cylindrical member 9. During the operation of the servo, winding 11 is continuously energized in order to drive shaft 3 and fly wheel 12.

Disk section 6 also contains two openings for retaining two sets of ball bearings 13, only one of which is shown, for mounting the magnetic clutch members 14 and 15. Each of the magnetic clutch members has a cylindrical member 16, which extends through the center of each clutch member and projects beyond the clutch member and through the ball bearings 13. Mounted on the member 16 of clutch member 14 is a gear 17, while the member 16 of clutch member 15 mounts a gear 18. Projecting from each of these gears is the cup member 19 which serves to retain the winding 20 and core 21 of each clutch member in position on cylindrical member 16. A phenolic member 22 serves to separate the core from the winding. The rotation of either gear 17 or 18 will cause the elements of the corresponding magnetic clutch member, including cylindrical member 16, to also rotate.

In order to provide an electrical circuit for the rotating magnetic clutch members 14 and 15, the end of cylindrical member 16 receives one end of an insulated member 23. The other end of member 23 contains two silver rings 24 and 25 which are separated from one another. Wiper arms 26 and 27 continually bear against silver rings 24 and 25 respectively and are secured at one end to conducting members 28 and 29, which are mounted on two posts 30 (only one of which is shown) integral with disk section 6. The conducting members 28 and 29 are separated from one another by insulated guard members 31, which project the entire length of the wiper arms and serve to keep the wiper arms positioned on the silver rings. Leads 28a and 29a connect respectively with the conducting members 28 and 29 in order to provide an energizing circuit for operation of the magnetic clutch members. The winding 20 of each of the magnetic clutch members is connected by lead 32 to silver ring 24 and by lead 33 to silver ring 25 so that the winding can be energized through the wiper arms during the continuous rotation of the magnetic clutch members. A pinion gear 34 meshes with gear 18 so that it will continually drive the gear and the magnetic clutch member 15 in one direction and also gear 18 meshes with gear 17 so that it will continually drive gear 17 and magnetic clutch member 14 in the opposite direction. It is therefore apparent that during the operation of the servo mechanism, the shaft 3 and both the magnetic clutch members will be continuously driven because of the fact that winding 11 is continuously energized.

Formed integrally with disk section 6 are three arms 35, 36 and 37 which extend forwardly to provide part of the mounting for a frame section 38. The end plate 39 is spaced from frame section 38 and has four arms 40, 41, 42 and 43 extending rearwardly to provide additional support for frame section 38. The frame section 38 is secured to arms 40 and 43 by means of bolts 44 and is secured between arms 41 and 35 and between arms 42 and 36 by means of bolts 45. In addition, bolts 46 serve to secure frame section 38 to arm 37. It is therefore apparent that end plate 39, frame section 38, disk section 6 and back plate 1 are formed into an integral supporting frame for the elements of servo mechanism.

Figure 4:
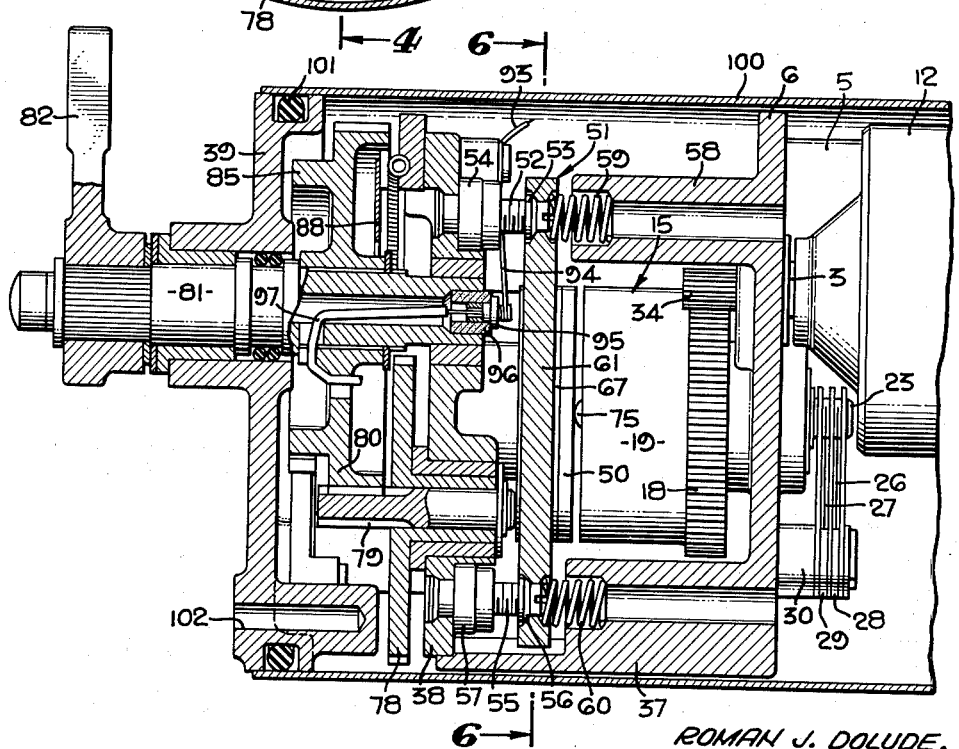
Fig. 4 is a vertical section taken along lines 4—4 of Fig. 3, showing one of the magnetic clutches in elevation.
Figure 6:
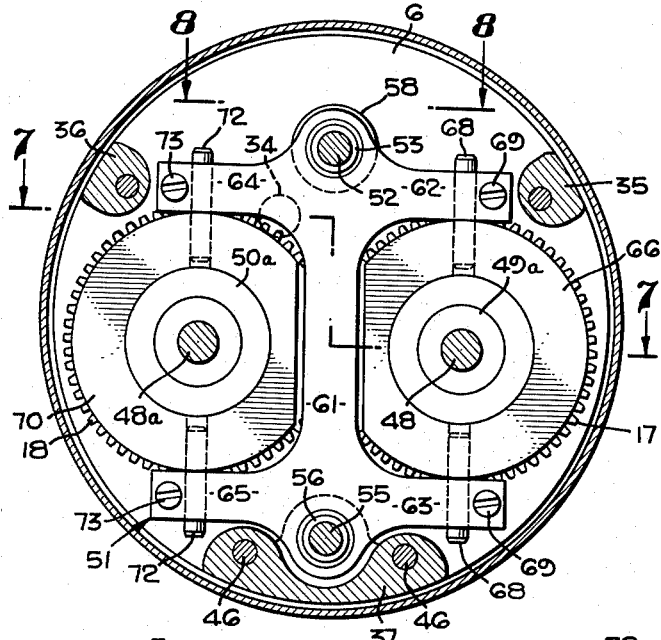
Fig. 6 is a vertical transverse section taken along lines 6—6 of Fig. 4, illustrating the yoke member for supporting the clutch brakes.

The frame section 38 contains two openings for housing the sets of ball bearings 47 which rotatively support the shafts 48 and 48a for clutch plates 49 and 50, designed to cooperate with magnetic clutch members 14 and 15 respectively. These clutch plates have hubs 49a and 50a which are pinned to shafts 48 and 48a and are of the same diameter as the magnetic clutch members 14 and 15 and are normally spaced somewhat from the clutch members. A braking mechanism is supplied which normally prevents the rotation of either of the clutch plates and is comprised of a yoke member 51 which is placed between the disk section 6 and frame section 38. The yoke member is pivotally supported on its upper side by a screw 52 which has a conically shaped head 53, projecting into a conical opening in the yoke member (see Fig. 4). An elastic stop nut 54 is secured in an opening in frame section 38 and receives the screw 52. In a similar manner, screw 55 pivotally supports the lower end of the yoke member and has a conical head 56 which projects into a conical opening in the yoke member. The elastic stop nut 57 is secured in an opening in frame section 38 and receives the screw 55. The position of the conical heads on screws 52 and 55 can be adjusted by rotation of the screws so that the spacing of the yoke member 51 from the frame section 38 can be adjusted.

Formed integral with disk section 6 is a hollow extension 58 which has an enlarged opening at its end. This opening provides a seat for one end of spring 59, while the other end of spring 59 fits into an opening in member 51 which is opposite to the opening in member 51 which receives the conical head 53 of screw 52. Also, the member 37 contains an enlarged opening which provides a seat for one end of spring 60 and the other end of spring 60 rests in an opening in member 51 which is opposite the conical opening in member 51 which receives the conical head of screw 55. It is therefore apparent that the springs 59 and 60 will keep the yoke member 51 in place against screws 52 and 55 and will allow the yoke to pivot about the line between the two screws.

The yoke member 51 has a center vertical member 61 and a pair of arms 62, 63 extending to one side of the vertical member and another pair of arms 64, 65 extending to the other side of the vertical member. Positioned between the arms 62 and 63 is a circular brake mounting ring 66 which mounts, on one side, a phenolic brake 67. The brake mounting ring 66 has pins 68 on opposite sides which are received by openings in arms 62 and 63. The arms 62 and 63 are split so that they can be clamped against the pins 68 by tightening screws 69. The mounting ring 66 is free to pivot about the pins 68. Likewise, a circular brake mounting ring 70 is positioned between arms 64 and 65 and carries a phenolic brake 71. Pins 72 extend from opposite sides of mounting ring 70 and are secured in openings in arms 64 and 65. The arms 64 and 65 are slotted so that they can be securely pressed against pins 72 by tightening screws 73. The brake mounting ring 70 is free to pivot about the axial line of pins 72.

Yoke member 51 is so positioned that the brakes 67 and 71 are positioned directly forward of the clutch plates 49 and 50 respectively and surround shafts 48 and 48a of the clutch plates. Positioned within the opening in cylindrical member 16 of each magnetic clutch member is a spring 74 which has one end bearing against a ledge within the opening. The other ends of springs 74 bear against balls 75 which are likewise partially positioned within the openings in cylindrical members 16. When both of the magnetic clutch members are de-energized, the balls 75 are forced against clutch plates 49 and 50 with equal force by springs 74 and the clutch plates 49 and 50 assume positions out of contact with the ends of the rotating magnetic clutch members. In this condition, the plates are forced against the brakes 67 and 71 and are thereby positively held against rotation. However, when one or the other magnetic clutch members is energized, the corresponding clutch plate will be drawn, against the force of spring 74, into contact with the face of insulated member 22 and the clutch plate will be rotated along with the magnetic clutch member.

When one clutch plate is drawn against its magnetic clutch member, the other clutch plate will be forced outwardly by ball 75 until the hub of the clutch plate strikes the inner race for the ball bearings 47 which support the clutch plate. The force of ball 75 of the non-energized clutch will therefore cause yoke member 51 to pivot about screws 52 and 55. Since the distance that one clutch plate can move toward the energized magnetic clutch member is greater than the distance which the other clutch plate can move away from the non-energized magnet clutch member, the brakes 67 and 71 will not be acting against the clutch plates during the time one or the other of the magnetic clutch members is energized.

Figure 8:
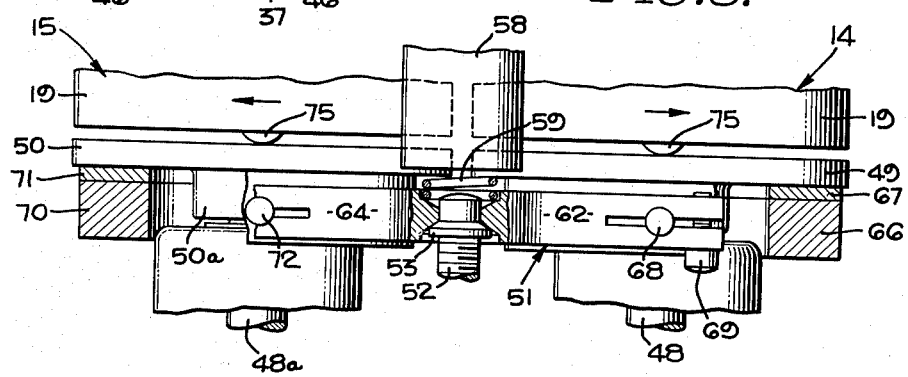
Fig. 8 is a plan view taken along lines 8—8 of Fig. 6, showing both clutch plates in non-engaging position.
Figure 9:
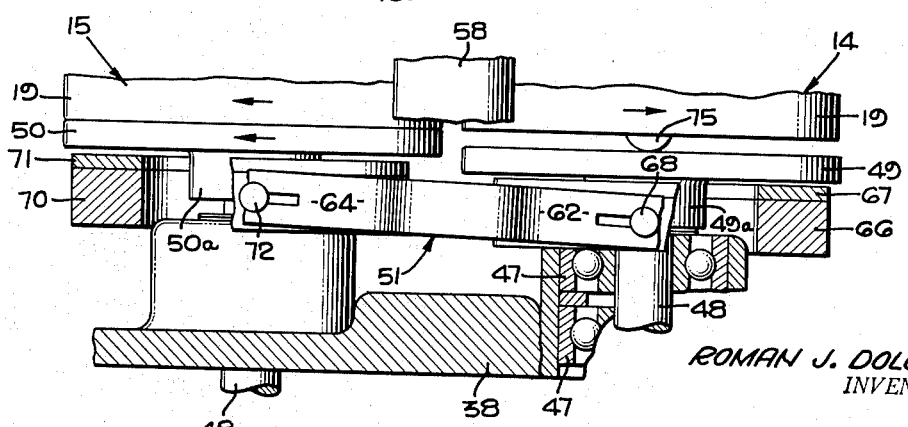
Fig. 9 is a view similar to Fig. 8, showing one of the clutch plates in an engaging position.
Figure 7:
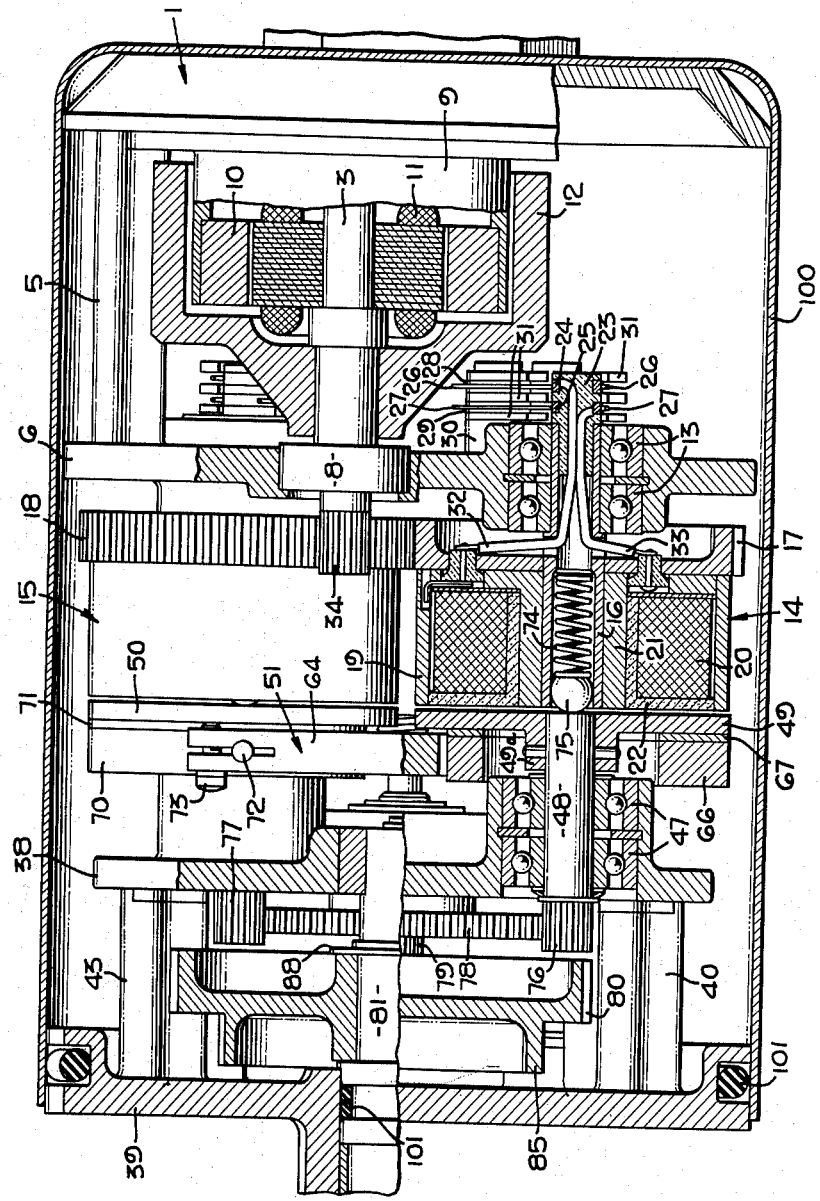
Fig. 7 is a horizontal sectional view taken along lines 7—7 of Fig. 6, showing one of the magnetic clutches in cross section.

The various positions assumed by the yoke member 51 and the clutch plates are illustrated in Figs. 8 and 9. The normal position of the yoke member, when neither of the magnetic clutch members is energized, is illustrated in Fig. 8. The springs 74 act through balls 75 with equal force on the clutch plates 49 and 50 and thereby cause these clutch plates to be forced against brakes 67 and 71 respectively and positively held against rotation. Since the clutch plates 49 and 50 are positioned away from their corresponding magnetic clutch members, there will be no tendency for the clutch members to rotate the plates even though the clutch members are constantly rotating in opposite directions, as indicated by the arrows. The position assumed by the yoke member 51, when magnetic clutch member 15 is energized, is illustrated in Fig. 9. The clutch plate 50 is drawn by magnetic force against the clutch member 15 and will rotate with the clutch member in the direction indicated by the arrows. Since the magnetic force of clutch member 15 on plate 50 has overcome the force of spring 74 on this clutch plate, the spring of non-energized magnetic clutch member 14 will force clutch plate 49 away from clutch member 14 until hub 49a strikes the inner race of ball bearings 47. Because the distance which clutch plate 50 has moved toward clutch member 15 is greater than the distance which clutch plate 49 has moved away from clutch member 14, the brakes 67 and 71 will not be forced against the corresponding clutch plates. Under these conditions, the clutch plate 50 will be positivey rotated until such time as the magnetic clutch member 15 is de-energized. When this occurs, the spring 74 of clutch member 15 will force the clutch plate 50 back against brake 71 to positively stop the rotation of the clutch plate 50 and yoke member 51 will again assume the normal position shown in Fig. 8. If the magnetic clutch member 14 is energized, the reverse action will take place and clutch plate 49 will be drawn against the magnetic clutch member 14 and the plate 50 will be moved until hub 50a strikes the inner race of bearings 47. Therefore, as long as magnetic clutch member 14 is energized, the clutch plate 49 will be rotated by this clutch member. Since the brake mounting rings 66 and 70 are pivotally mounted, they can always assume the correct position to either brake or relieve the clutch plates 49 and 50 during the operation of the servo mechanism.

The shafts 48 and 48a carry pinion gears 76 and 77 respectively which continually engage the large gear 78, rotatively mounted in frame section 38. The length of pinion gears 76 and 77 are sufficient so that they can move with clutch plates 49 and 50 and still remain in contact with gear 78. The gear 78 carries a pinion gear 79 which drives the gear 80, positioned adjacent to end plate 39. The gear 80 is rigidly carried on a hollow shaft 81, rotatively mounted by end plate 39 and by frame section 38. The shaft 81 projects beyond the end plate 39 and mounts an output arm 82 which can be connected to the control surface of an aircraft or to any other device desired to be controlled. By the gear trains just described, the rotation of either clutch plate 49 or clutch plate 50, which results from the energizing of the corresponding magnetic clutch member, will be transmitted to shaft 81 and will cause movement of output arm 82. The position of arm 82 can be adjusted in either direction by energizing the proper magnetic clutch member.

In order to prevent the output arm 82 from moving too far in either direction, a pair of limit switches 83 and 84 are mounted on end plate 39 and are spaced apart the required amount. A cylindrical projection 85 on gear 80 adjustably mounts, by means of screws 87, two actuating arms 86 (only one of which is shown) which are so positioned on member 85 that they will break either limit switch 83 or 84 when the gear 80 has rotated the desired maximum amount in either direction. The limit switches 83 and 84 are placed in series with magnetic clutch members 14 and 15 respectively so that when either limit switch is broken, the corresponding magnetic clutch member will be de-energized and no further movement of output arm can take place. However, when both the limit switches are closed, movements of the gear 80 will not interfere with the operation of the magnetic clutch members.

An electrical follow-up is provided for the servo mechanism, which includes an electrical contact plate 88 which is approximately U shaped and secured to gear 80 by means of screws 89. Each arm of contact plate 88 is insulated from gear 80 and has two right angle bends so as to space the main body of the plate away from the back of gear 80. The wiper 90 is carried by the contact plate and continually bears against winding 91, which is mounted in a curved insulated plate 92 attached to frame section 38. Electrical energy is supplied to the rotating wiper 90 by a lead 93 which connects to a conducting plate 94, carried by and insulated from a post secured to stationary frame section 38. The end of plate 94 has a small projection bearing against the surface of a silver plug 95 which is positioned in an insulated cylindrical member 96 inserted in the open end of shaft 81. The silver plug 95 will rotate with gear 80 while conducting plate 94 is held stationary because of its connection with frame section 38. The lead 97 connects the silver plug 95 with contact plate 88 in order to complete the circuit between plate 94 and rotating wiper 90. Two leads 98 and 99 connect with opposite ends of the winding 91 and the electrical energy in these two leads can be used to modify the external control circuit for the magnetic clutches so as to obtain a follow-up action for the servomechanism. The position of the wiper 90 on the winding 91 will determine how the electrical energy of wiper 90 will be divided between leads 98 and 99.

The complete servo mechanism is enclosed in a cup-shaped casing 100 which is closed by end plate 39. All openings in the casing and in the end plate 39 and back plate 1 are sealed by O rings 101, so that the servo mechanism will be housed in an air and water-tight enclosure. The holes 102 are formed integrally with end plate 39 to provide a means for mounting the servo mechanism.

When the servo mechanism is in operation, magnetic clutch members 14 and 15 will be continuously rotated in opposite directions by motor shaft 3. When both windings 20 are de-energized, the clutch plates 49 and 50 are positively held against movement by the brakes 67 and 71 respectively. Upon the energization of either winding 20, the corresponding clutch plate will be quickly drawn into engagement with the rotating magnetic clutch member in order to obtain immediate movement of the output arm 82 of the servo. At the same time, both clutch plates 49 and 50 will be released from the braking action since the yoke member 51 and the brake mounting rings 66 and 70 are free to rotate into a position out of engagement with the clutch plates. When either of the windings 20 is de-energized, the force of springs 74 will immediately re-engage the clutch plates with the brake mechanism.

The fly wheel 12 serves as an inertia member to maintain the speed of rotation of clutches 14 and 15 approximately constant, regardless of whether the clutches are disengaged or engaged or in the process of engagement. It is therefore apparent that the servo mechanism of this invention will provide for immediate movement of the output arm in response to a control signal and that the overshoot of the output arm will be held to a minimum. In the absence of a control signal, the output arm will be held against movement in either direction by the novel braking means of this invention. Since the clutches are electrically operated, a simple limit switch arrangement can be utilized because it is only necessary to place the limit switches in series with the corresponding magnetic clutches. Also, a simple electrical follow-up can be provided since the servo mechanism operates in response to electrical control signals.

It is understood that the servo mechanism of this invention is adaptable for a wide variety of uses, including the movement of the control surface of an aircraft, and that the full mechanical, electrical and hydraulic equivalents of the present embodiment are within the scope of this invention. Various other modifications are contemplated and may obviously be resorted to by those skilled in the art without departing from the sphere and scope of the invention, as hereinafter defined by the appended claims.

What is claimed is:

1. In a servo mechanism, first and second frame sections rigidly secured together, a pair of clutches each having a continuously rotating driving member mounted by said first frame section and a driven member mounted by said second frame section and movable into and out of engagement with said driving member, said driving members being rotated in opposite directions, a yoke member positioned between and pivotally mounted by said frame sections about an axis equally spaced from said clutches, a pair of braking means pivotally mounted by said yoke member with one braking means in the path of movement of each of said driven members, a pair of spring means each normally urging one of said driven members against one of said braking means to prevent movement of said driven members, means for moving one of said driven members into engagement with one of said driving members against the force of one of said spring means, and stop means for limiting the movement of said other driven member by said other spring means so that both said driven members are freed from said braking means when said one driven member is engaged.

2. In a servo mechanism for moving a control element, a pair of clutches each having a continuously rotated driving member and a driven member movable into and out of engagement with said driving member, said driving members being rotated in opposite directions, a pair of braking means carried by a pivotally mounted member with one braking means positioned in the path of each of said driven members, a pair of spring means each normally urging one of said driven members against one of said braking means and out of engagement with its driving member, means for moving one of said driven members into engagement with one of said driving members against the force of one of said spring means, and stop means for limiting the movement of said other driven member away from said other driving member by said other spring means, the movement of said one driven member being greater than the movement of said other driven member so that both said driven members are freed from said braking means when said one driven member is engaged.

3. In a servo mechanism for moving a control element, a pair of clutches each having a continuously rotated driving member and a driven member movable into and out of engagement with said driving member, a pair of braking means carried by a pivotally mounted member with one braking means positioned in the path of each of said driven members, a pair of spring means each normally urging one of said driven members against one of said braking means and out of engagement with its driving member, means for moving one or the other of said driven members into engagement with its driving member against the force of one of said spring means, and stop means for limiting the movement of the disengaged driven member away from its driving member by the force of the other of said spring means so that both said driven members are freed from said braking means.

4. A servo mechanism for moving a control element comprising a continuously rotating inertia member, a pair of magnetic clutches each having a magnet continuously rotated by said inertia member and a clutch plate mounted for axial movement toward and away from said magnet, pivotally mounted braking means for engaging said clutch plates, spring means for normally holding said clutch plates away from said magnets and in engagement with said braking means, and means for energizing one or the other of said rotating magnets to pull one of said clutch plates against said energized magnet and free both of said clutch plates from said braking means.

5. A servo mechanism for moving a control element comprising a continuously rotating inertia member, a pair of magnetic clutches each having a magnet continuously rotated by said inertia member and a clutch plate mounted for axial movement toward and away from said magnets, said magnets and said clutch plates comprising elements of two separate gear trains connecting with said control element, a yoke member mounted for rotation about an axis positioned between said magnets, a pair of braking means each positioned in the path of one of said clutch plates and pivotally mounted on said yoke member, a spring means carried by each of said magnets, each spring means continually acting against one of said clutch plates to axially move both said clutch plates away from said magnets and against said braking means, means for energizing either of said magnets to move one of said clutch plates against the force of one of said spring means into contact with said energized magnet for rotation therewith, the other of said spring means acting to move the other of said clutch plates away from the de-energized magnet, stop means for limiting the movement of said other clutch plate to a distance less than that moved by said one clutch plate in order to free both said clutch plates from said braking means.

6. A servo mechanism as set forth in claim 5, wherein said two separate gear trains contain a common gear, limit stop means carried by said gear for de-energizing one or the other of said magnets when maximum movement of said gear in either direction takes place, and wiper means carried by said gear to provide a follow-up for the servo mechanism.

7. A device for positively braking the output of a servo mechanism having two separate output members, comprising a yoke member mounted for rotation about an axis positioned between said output members, a pair of braking means mounted on said yoke member with one braking means positioned for engagement with each of said output members, spring means normally forcing said output members into engagement with said braking means, and means for moving one of said output members against said spring means a sufficient distance to relieve the braking effect of said braking means on said output members during operation of either of said output members.

8. A servo mechanism for moving a control element comprising a pair of clutches each having a continuously rotated driving member and a driven member mounted for axial movement toward and away from said driving member, pivotally mounted braking means for engaging said driven members, means for normally urging said driven members away from said driving members and into engagement with said braking means, means for selectively moving one or the other of said driven members against said urging means and into engagement with its driving member, and means for limiting the movement of the disengaged driven member away from its driving member by said urging means to permit said braking means to pivot and release both said driven members.

References Cited in the file of this patent

UNITED STATES PATENTS

| 2,176,897 | Fodor | Oct. 24, 1939 |
| 2,426,505 | Hill | Aug. 26, 1947 |
| 2,556,318 | Cooper | June 12, 1951 |
| 2,573,593 | Norden et al. | Oct. 30, 1951 |
| 2,594,775 | Herst et al. | Apr. 29, 1952 |
| 2,595,190 | Edwards, Jr. | Apr. 29, 1952 |